United States Patent
Hui et al.

(10) Patent No.: US 11,343,774 B2
(45) Date of Patent: May 24, 2022

(54) ENHANCED FRAME PENDING

(71) Applicant: Google LLC, Mountain View, CA (US)

(72) Inventors: Jonathan Wing-Yan Hui, Belmont, CA (US); Martin A. Turon, Berkeley, CA (US)

(73) Assignee: Google LLC, Mountain View, CA (US)

( * ) Notice: Subject to any disclaimer, the term of this patent is extended or adjusted under 35 U.S.C. 154(b) by 575 days.

(21) Appl. No.: 16/325,674

(22) PCT Filed: Sep. 7, 2018

(86) PCT No.: PCT/US2018/050051
§ 371 (c)(1),
(2) Date: Feb. 14, 2019

(87) PCT Pub. No.: WO2020/050859
PCT Pub. Date: Mar. 12, 2020

(65) Prior Publication Data
US 2021/0337473 A1    Oct. 28, 2021

(51) Int. Cl.
*H04W 52/02* (2009.01)
*H04W 4/80* (2018.01)
(Continued)

(52) U.S. Cl.
CPC ......... *H04W 52/0235* (2013.01); *H04W 4/80* (2018.02); *H04W 24/08* (2013.01);
(Continued)

(58) Field of Classification Search
CPC ......... H04W 52/0235; H04W 28/0278; H04W 40/10; H04W 4/80; H04W 24/08; H04W 84/18
See application file for complete search history.

(56) References Cited

U.S. PATENT DOCUMENTS 8,576,761 B1* 11/2013 Pitchaiah .......... H04W 52/0206
370/311
2007/0129081 A1* 6/2007 Seo ..................... H04W 28/021
455/453

(Continued)

FOREIGN PATENT DOCUMENTS

JP    2008072415    3/2008
KR    20160096641   8/2016

(Continued)

OTHER PUBLICATIONS

Request for Comments (RFC) 8352 "Energy-Efficient Features of Internet of Things Protocol"; Gomez et al.; Apr. 2018 (Year: 2018).*

(Continued)

*Primary Examiner* — Benjamin H Elliott, IV
(74) *Attorney, Agent, or Firm* — Colby Nipper PLLC

(57) ABSTRACT

This document describes techniques and devices to reduce energy consumption and network traffic related to polling for buffered data packets (e.g., messages) between devices in a wireless mesh network. Based on the requirements of an end device that sleeps to conserve power, a parent device receives and buffers data packets addressed to the end device until the end device is awake. The end device periodically wakes-up to transmit application data, such as a sensor reading or a status message, to the parent device. By including an indication of pending data at the parent device in an acknowledgement the transmission of by end device, additional data request messages and acknowledgements can be reduced or eliminated to improve the battery life of the end device and reduce network traffic on the mesh network.

25 Claims, 8 Drawing Sheets

(51) Int. Cl.
*H04W 24/08* (2009.01)
*H04W 28/02* (2009.01)
*H04W 40/10* (2009.01)
*H04W 84/18* (2009.01)

(52) U.S. Cl.
CPC ....... *H04W 28/0278* (2013.01); *H04W 40/10* (2013.01); *H04W 84/18* (2013.01)

(56) References Cited

U.S. PATENT DOCUMENTS

| | | | |
|---|---|---|---|
| 2008/0070614 A1* | 3/2008 | Ogushi | H04W 52/0216 455/522 |
| 2009/0279464 A1* | 11/2009 | Kakani | H04W 52/0219 370/311 |
| 2010/0061272 A1* | 3/2010 | Veillette | H04L 45/48 370/254 |
| 2012/0063389 A1* | 3/2012 | Abedi | H04L 45/28 370/328 |
| 2014/0226667 A1* | 8/2014 | Veillette | H04L 45/48 370/392 |
| 2014/0269406 A1* | 9/2014 | Nanni | H04L 12/2803 370/254 |
| 2017/0142750 A1* | 5/2017 | Lee | H04W 40/244 |

FOREIGN PATENT DOCUMENTS

| | | | | |
|---|---|---|---|---|
| KR | 20180131361 | 12/2018 | | |
| WO | WO-2020050859 A1 * | 3/2020 | ........ | H04W 52/0216 |

OTHER PUBLICATIONS

"International Search Report and Written Opinion", PCT Application No. PCT/US2018/050051, dated Apr. 10, 2019, 12 pages.

"OSNP Over IEEE 802.15.4", Downloaded from https://github/bitgamma/osnp/wiki/OSNP-over-IEEE-802.15.4, May 13, 2014, 18 pages.

Kohvakka, et al., "Performance Analysis of IEEE 802.15.4 and ZigBee for Large-Scale Wireless Sensor Network Applications", Tampere University of Technology Institute of Digital and Computer Systems, 33720 Tampere, Finland, Oct. 6, 2006, 10 pages.

Lee, "A Study on the Safe and Efficient Method of Transmitting Data in ZigBee Network", Indian Journal of Science and Technology, vol. 9(24), DOI: 10.17485/ijst/2016/v9i24/96054, Jun. 2016, Jun. 2016, 5 pages.

"International Preliminary Report on Patentability", Application No. PCT/US2018/050051, dated Mar. 9, 2021, 7 pages.

"Foreign Office Action", KR Application No. 10-2020-7033807, dated Jun. 20, 2021, 13 pages.

"Foreign Office Action", IN Application No. 202047049981, dated Dec. 8, 2021, 5 pages.

* cited by examiner

ENHANCED FRAME PENDING

RELATED APPLICATION

This application is a 35 U.S.C. § 371 national stage filing of PCT International Application No. PCT/US2018/050051 filed Sep. 7, 2018, the disclosure of which is incorporated by reference herein in its entirety.

BACKGROUND

Using wireless mesh networking to connect devices to each other, and to cloud-based services, is increasingly popular for sensing environmental conditions, controlling equipment, and providing information and alerts to users. Many devices on wireless mesh networks are designed to operate for extended periods of time on battery-power, which limits the available computing, user interface, and radio resources in the devices.

Additionally, some wireless mesh network devices may sleep periodically to reduce power consumption and are not in constant radio contact with the mesh network to receive data packets. Sleeping mesh network end devices may periodically wake-up and transmit data, such as sensor data or status, to a parent device. After receiving an acknowledgement for the transmitted data or status from the parent device, the end device must send an additional data request command message to determine if the parent device has a buffered data packet to send to the end device. For many types of end devices that have limited need to receive data packets, such as a sensor, the parent will infrequently have a buffered data packet for the end device. The transmission of the data request command and the reception of a response to the data request command needlessly consumes power that shortens the battery life of the end device.

SUMMARY

This summary is provided to introduce simplified concepts of enhanced frame pending, generally related to providing an indication of pending data for an end device by a parent device in a wireless mesh network. The simplified concepts are further described below in the Detailed Description. This summary is not intended to identify essential features of the claimed subject matter, nor is it intended for use in determining the scope of the claimed subject matter.

In aspects, methods, devices, systems, and means for enhanced frame pending in a wireless mesh network are described in which a parent device receives a data message from an end device and, in response to receiving the data message, determines whether there is a buffered message for the end device. The parent device either: in response to determining there is not a buffered message for the end device, transmits a data message acknowledgement including a frame pending value indicating there is not a buffered message for the end device, or in response to determining there is a buffered message for the end device, transmits the data message acknowledgement including the frame pending value indicating there is a buffered message for the end device, which is effective to cause the end device to request the buffered message.

In other aspects, methods, devices, systems, and means for enhanced frame pending in a wireless mesh network are described in which an end device transmits a data message to a parent device and in response to the transmission of the data message, receives a data message acknowledgement including an indication of whether the parent device is buffering a message for the end device. The end device either: transmits a data request command that is effective to cause the parent device to transmit the buffered message and receives the buffered message from the parent device, or transitions to a low-power state.

The details of one or more implementations are set forth in the accompanying drawings and the following description. Other features and advantages will be apparent from the description and drawings and from the claims. This summary is provided to introduce subject matter that is further described in the Detailed Description and Drawings. Accordingly, this summary should not be considered to describe essential features nor used to limit the scope of the claimed subject matter.

A method of indicating pending data by a parent device in a wireless mesh network is provided. The method comprises receiving, by the parent device, a data message from an end device. The method further comprises, in response to receiving the data message, determining whether there is a buffered message for the end device. The method further comprises either: responsive to determining there is not a buffered message for the end device, transmitting a data message acknowledgement including a frame pending value indicating there is not a buffered message for the end device, or responsive to determining there is a buffered message for the end device, transmitting the data message acknowledgement including the frame pending value indicating there is a buffered message for the end device, which is effective to cause the end device to request the buffered message.

The method may further comprise receiving, by the parent device, a data request command from the end device, and in response to the data request command, transmitting the buffered message to the end device.

The data request command may be an IEEE 802.15.4 Data Request command.

The method may further comprise receiving, by the parent device, a parent request message that indicates that the end device is configured to receive buffered messages in response to transmitting the data request command, and in response to receiving the parent request message, configuring the parent device to transmit the buffered messages to the end device in response to receiving the data request command from the end device.

If the parent device fails to receive an acknowledgement in response to transmitting the buffered message, the parent device may buffer the message until receiving another data request command from the end device.

The method may further comprise receiving, by the parent device, a message addressed to the end device, acknowledging the message on behalf of the end device, and buffering the message.

The data message may be an IEEE 802.15.4 data message.

A mesh network device configured as a parent device is also provided. The mesh network device comprises a mesh network interface configured for communication in a wireless mesh network, and a memory and processor system to implement a routing application. The routing application is configured to receive a data message from an end device. The routing application is further configured to, in response to the reception of the data message, determine whether there is a buffered message for the end device. The routing application is further configured to either: in response to the determination that there is not a buffered message for the end device, transmit a data message acknowledgement including a frame pending value indicating there is not a buffered message for the end device, or in response to the determination that there is a buffered message for the end device, transmit the data message acknowledgement including the frame pending value indicating there is a buffered message for the end device, which is effective to cause the end device to request the buffered message.

The routing manager application may be further configured to receive a data request command from the end device and in response to the data request command, transmit the buffered message to the end device.

The data request command may be an IEEE 802.15.4 Data Request command.

The routing manager application may be further configured to receive a parent request message that indicates that the end device is configured to receive buffered messages in response to the transmission of the data request command, and in response to the reception of the parent request message, configure the parent device to transmit the buffered messages to the end device in response to receiving the data request command from the end device.

The routing manager application may be further configured to, if the parent device fails to receive an acknowledgement in response to the transmission of the buffered message, buffer the message until receiving another data request command from the end device.

The transmission of the data message acknowledgement, including the frame pending value indicating there is a buffered message for the end device, may cause the end device to keep a receiver on to receive the buffered message after receiving the data message acknowledgement. The routing manager application may be further configured to transmit the buffered message to the end device after the transmission of the data message acknowledgement and without receiving a data request command from the end device.

The data request command may be an IEEE 802.15.4 data message.

A mesh network device configured as an end device is also provided. The mesh network device comprises a mesh network interface configured for communication in a wireless mesh network, and a memory and processor system to implement a routing application. The routing application is configured to transmit a data message to a parent device. The routing application is further configured to, in response to the transmission of the data message, receive, from the parent device, a data message acknowledgement including an indication of whether the parent device is buffering a message for the end device. The routing application is further configured to either: transmit a data request command that is effective to cause the parent device to transmit the buffered message and receive the buffered message from the parent device, or transition to a low-power state.

The end device may transition from a low-power state to a high-power state before the transmission of the data message to the parent device.

The routing manager application may be further configured to transition the end device to the low-power state after receiving the data message acknowledgement and after a period of time, transition the end device to the high-power state before transmitting the data request command.

The routing manager application may be further configured to transmit, to the parent device, a parent request message that indicates that the end device is configured to receive buffered messages in response to the transmission of the data request command, the transmission being effective to configure the parent device to transmit the buffered messages to the end device in response to receiving the data request command from the end device.

The data request command may be an IEEE 802.15.4 Data Request command.

The data message may be destined for the parent device, or the transmission of the data message may cause the parent device to forward the message to another device mesh network device.

BRIEF DESCRIPTION OF THE DRAWINGS

Aspects of enhanced frame pending are described with reference to the following drawings. The same numbers are used throughout the drawings to reference like features and components.

DETAILED DESCRIPTION

Figure 1:
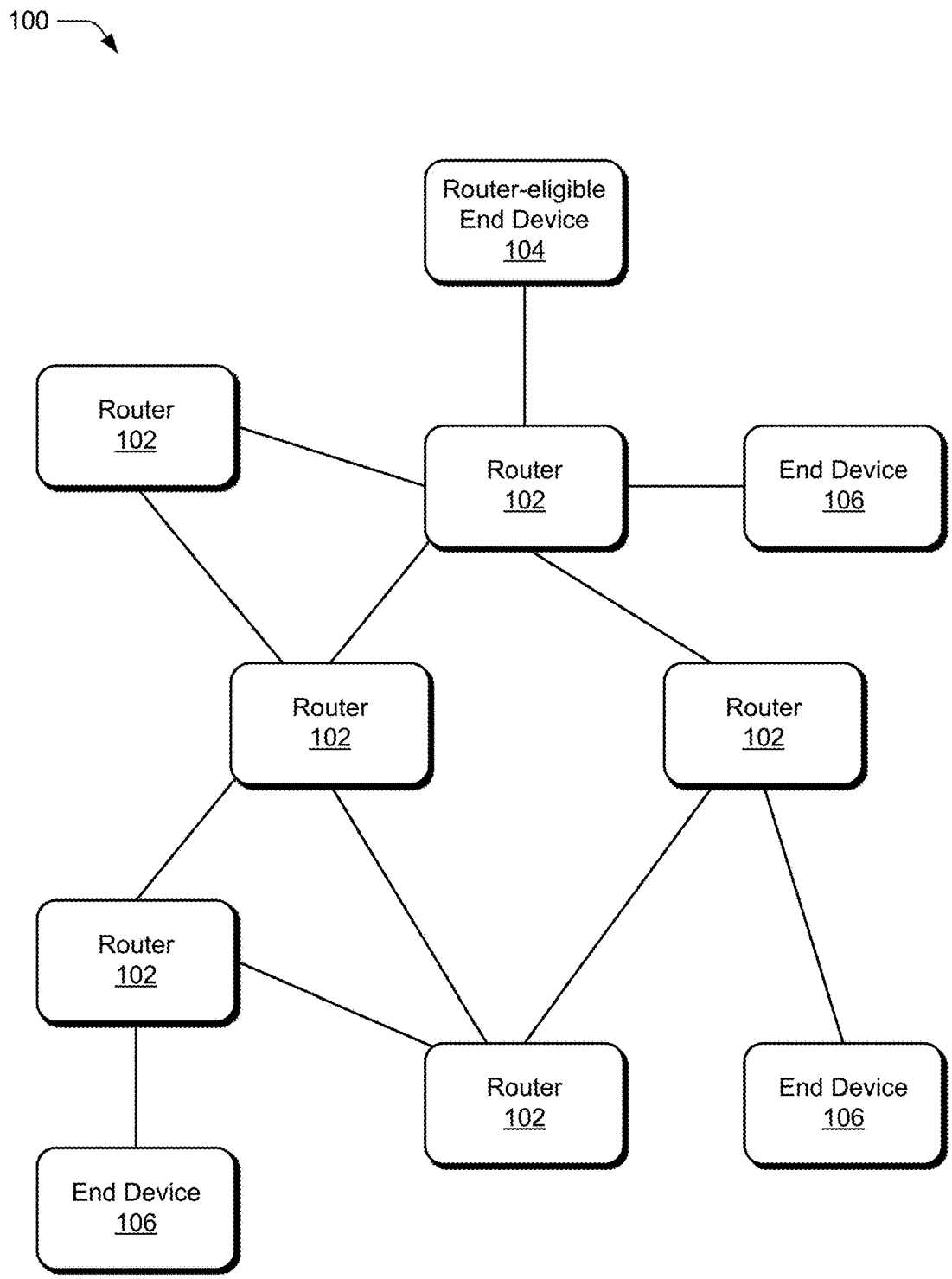
FIG. 1 illustrates an example mesh network system in which various aspects of enhanced frame pending can be implemented.

This document describes techniques and devices to reduce energy consumption and network traffic related to polling for buffered data packets (e.g., messages) between devices in a wireless mesh network. Based on the requirements of an end device that sleeps to conserve power (e.g., battery power), a parent device receives, acknowledges, and buffers data packets addressed to the end device until the end device is awake. The end device periodically wakes-up to transmit data, such as a sensor reading or a status message, to the parent device. By including an indication of pending data at the parent device in an acknowledgement of the transmission by the end device, additional data request messages and acknowledgements can be reduced or eliminated to improve the battery life of the end device and reduce network traffic on the mesh network.

Wireless mesh networks are communication networks having wireless nodes connected in a mesh topology that provides reliable and redundant communication paths for data traffic within the mesh network. Wireless mesh networks use multiple radio links, or hops, to forward data traffic between devices within the mesh network. This provides coverage for areas larger than the area covered by a single radio link.

Wireless mesh networks can be based on proprietary technologies, or standards-based technologies. For example, wireless mesh networks may be based on the IEEE 802.15.4 standard, which defines physical (PHY) layer and Media Access Control (MAC) layer features and services for use by applications at higher layers of a mesh networking stack. Upper-layer applications rely on these standards-defined services to support addressing and routing of packet data to support application-level communication across a mesh network and between the mesh network and external networks. Similarly, other wireless mesh network technologies, such as Bluetooth®, Thread®, ZigBee®, Z-Wave®, Bluetooth Low Energy (BLE), Bluetooth Smart, and Bluetooth Mesh have similar layered networking stacks.

Applications at a cloud-based service transmit packets to and receive packets from mesh network devices. These packets traverse a number of networks that use varying technologies. To facilitate low power operation, the mesh network uses low-power radio techniques that may use low data rates to conserve energy. Further, the network connection from a mesh network to the cloud-based service may include cellular wireless systems with bandwidth and cost constraints for transmitting data.

Many devices for mesh networks, such as sensors, are designed for low-power, battery operation over long periods of time, such as months or years. To achieve long service life, a battery-powered mesh device may turn off, or sleep, many of the device functions, such as radio and network interfaces, for periods of time. During sleep periods, the mesh device is not available on the mesh network to receive packets addressed to it. These sleeping mesh devices connect to a parent device that is capable of responding on behalf of the sleeping mesh device when it is not awake and active on the mesh network. The parent device buffers packets destined for the child device and responds on behalf of the child device.

In conventional systems, an end device transmits data to a parent device and receives an acknowledgement from the parent that does not include an indication of whether a data packet for the end device is buffered on the parent device. The end device transmits a data request command to the parent device to determine if there is a data packet buffered on the parent device and to request any buffered data. The parent device responds with the buffered data or an acknowledgement indicating whether there is a buffered data packet pending to send to the end device.

In aspects, acknowledgement messages sent in response to any received mesh network message are enhanced to include an indication of pending data for the mesh network device that sent the mesh network message. For example, a Media Access Control (MAC) entity in an end device transmits a MAC data frame in a message to a parent device. The message sent by the end device to the parent device may be a message destined for the parent device or a message that the parent device forwards on to another device. In response, the MAC entity of the parent device transmits an acknowledgement that includes a frame pending indication that indicates whether a data packet is pending for the end device or not. In response to receiving the acknowledgement, if the frame pending indication indicates that there is no data pending for the end device, the end device can turn off its receiver and return to a sleep state (e.g., a low-power state or low-power mode) to reduce power consumption. If the frame pending indication indicates that there is data pending for the end device, the end device can retrieve the data from the parent device.

In an alternative or optional aspect, the data request command sent from the end device to the parent device triggers the parent device to transmit the pending data packet instead of sending an acknowledgement indicating that there is a pending data packet. While the acknowledgement to a MAC data frame sent by the parent device indicates that a data packet is pending, the parent device waits until it receives the data request command before sending the pending data to the end device. For example, an end device may have a limited time window during which it can operate in a high-power state in which it can operate a mesh network radio and may need to transition to a low-power state to recharge a capacitor from a battery or harvest energy before it can operate the radio to request and receive the buffered data packet from the parent device. By having the parent device wait for an explicit data request command, the end device controls when it will receive messages based on the availability of resources (e.g., memory, computing, and/or power) to handle receiving the data.

In the alternative or optional aspect, the parent device can determine if the end device is configured to leave its receiver on to receive pending data after the data request. During the process of the end device attaching as a child to the parent device, the end device may indicate in a parent request message to the parent device that the end device supports receiving pending data in response to sending the data request command. Or the parent device can transmit the pending data after sending the acknowledgement to the data request command, and if the parent device receives an acknowledgement for the transmission of the pending data, the parent device can infer that the end device is configured to leave its receiver on to receive pending data after the data request.

While features and concepts of the described devices, systems, and methods for enhanced frame pending can be implemented in any number of different environments, systems, devices, and/or various configurations, aspects of enhanced frame pending are described in the context of the following example devices, systems, and configurations.

FIG. 1 illustrates an example system as a mesh network 100 in which various aspects of enhanced frame pending can be implemented. The mesh network 100 is a wireless mesh network that includes routers 102, a router-eligible end device 104, and end devices 106. The routers 102, the router-eligible end device 104, and the end devices 106, each include a mesh network interface for communication over the mesh network. The routers 102 receive and transmit packet data over the respective mesh network interfaces. The routers 102 also route traffic across the mesh network 100.

The router-eligible end device 104 is representative of router-eligible end devices that are located at leaf nodes of the mesh network topology and are not actively routing traffic to other nodes in the mesh network 100. The router-eligible device 104 is capable of becoming a router 102 when the router-eligible device 104 is connected to additional mesh network devices. The end devices 106 are devices that can communicate using the mesh network 100, but lack the capability, beyond simply forwarding packets to its parent router 102, to route traffic in the mesh network 100. For example, a battery-powered sensor is one type of end device 106.

Some end devices 106 may power down (i.e., sleep) some operations or hardware for a portion of the time the end device 106 is operational. For example, the end device 106 may power down radios or network interfaces, to conserve power between operations that require a connection to the mesh network 100. For example, a battery-powered temperature sensor may only be awake periodically to transmit a report of temperature, and then the temperature sensor sleeps until the next time the temperature sensor reports. When the end devices 106 sleep, the end devices 106 are not actively connected to the mesh network 100 to respond to address queries or to receive data packets over the mesh network 100.

Figure 2:
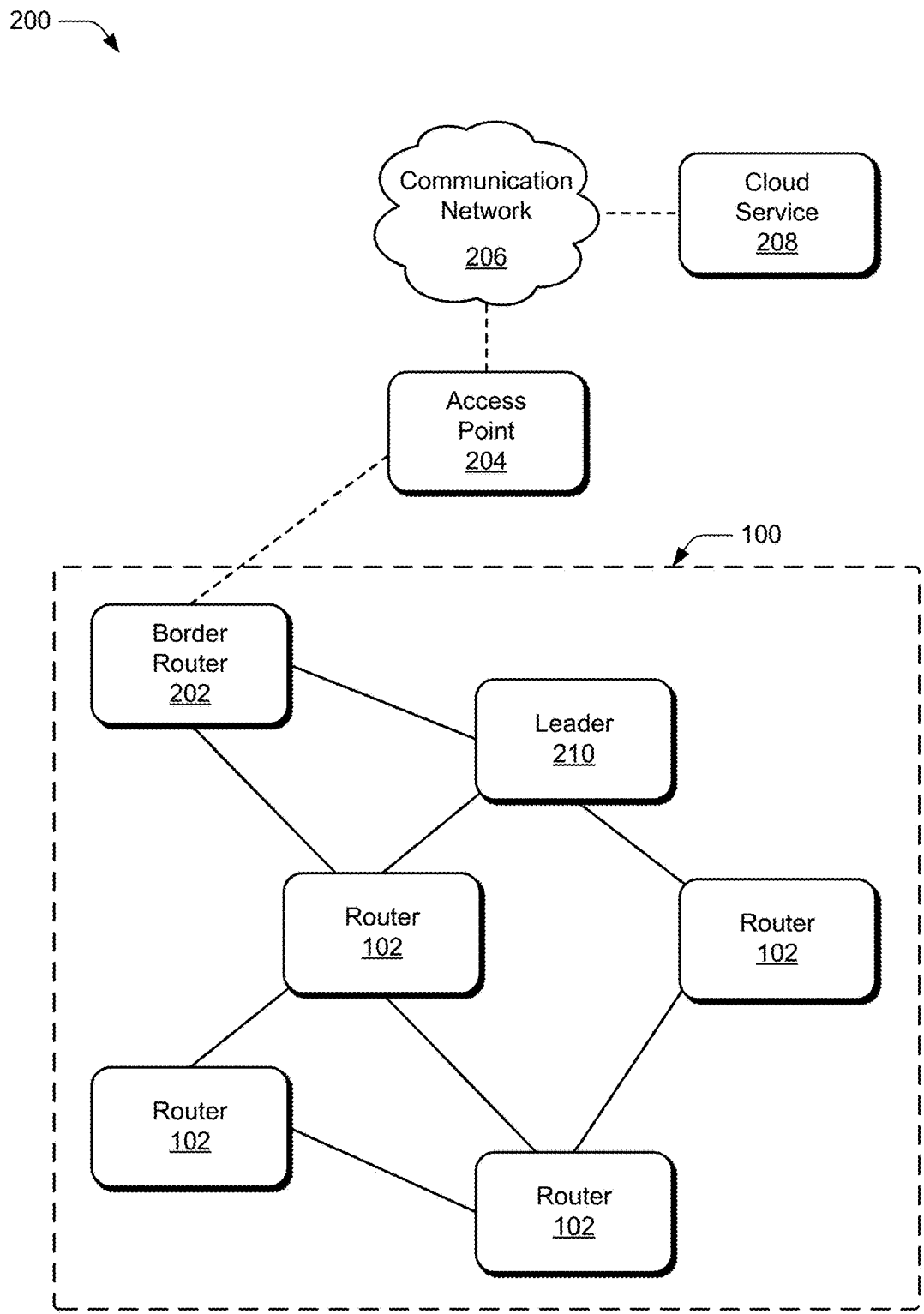
FIG. 2 illustrates an example environment in which various aspects of enhanced frame pending can be implemented.

FIG. 2 illustrates an example environment 200 in which various aspects and techniques of enhanced frame pending can be implemented. The environment 200 includes the mesh network 100, in which some routers 102 are performing specific roles in the mesh network 100.

A border router 202 (also known as a gateway and/or an edge router) is one of the routers 102. The border router 202 includes the mesh network interface, as well as a second interface for communication with an external network, outside the mesh network 100. The border router 202 connects to an access point 204 over the external network. For example, the access point 204 may be an Ethernet router, a Wi-Fi access point, a cellular base station, or any other suitable device for bridging different types of networks. Although a single border router 202 is shown in FIG. 2, for the sake of clarity, the mesh network 100 may have any number of border routers 202, which may connect to any number of external networks. In another implementation, an end device 106 may operate as a border router 202. In this case the end device operating as the border router 202 is routing traffic between the mesh network 100 and an external network, but not routing traffic between other mesh network devices.

The access point 204 connects to a communication network 206, such as the Internet. A cloud service 208, which is connected via the communication network 206, provides services related to and/or using the devices within the mesh network 100. By way of example, and not limitation, the cloud service 208 provides applications that include connecting end user devices, such as smart phones, tablets, and the like, to devices in the mesh network 100, processing and presenting data acquired in the mesh network 100 to end users, linking devices in one or more mesh networks 100 to user accounts of the cloud service 208, provisioning and updating devices in the mesh network 100, and so forth. Alternatively or optionally, services described in relation to the cloud service 208 may be distributed completely or partially between the cloud service 208 and a hub device (e.g., the border router 202, a security hub, or the like) that is installed at the structure where the mesh network devices are installed. The storage location of traits, resources, and interfaces of mesh network devices or structure-related information may be dynamically distributed in any suitable fashion between the cloud service 208 and the hub device.

One of the routers 102 performs the role of a leader 210 for the mesh network 100. The leader 210 manages router identifier assignment, is the central arbiter of network configuration information, and propagates network data, which includes the network configuration information, for the mesh network 100.

Enhanced Frame Pending

Figure 3A:
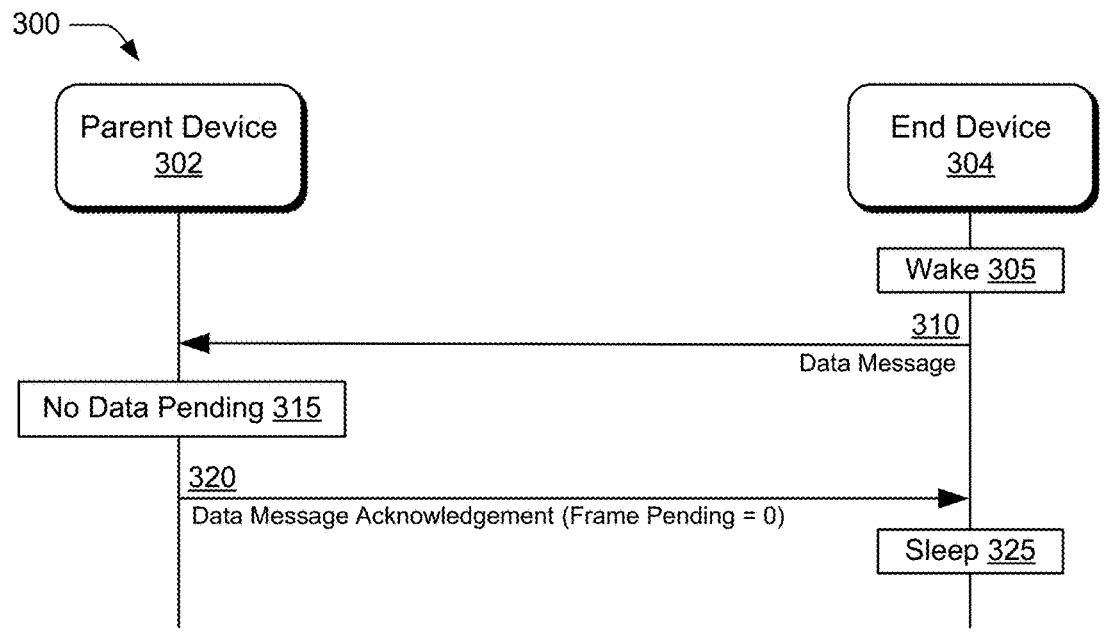
FIG. 3a illustrates example data and control transactions between a parent device and an end device in accordance with aspects of the techniques described herein.

FIG. 3a illustrates example data and control transactions between a parent device 302 and an end device 304 engaged in communication when there is no pending data packet for the end device 304 on the parent device 302. At 305 the end device 304 wakes (transitions from a low-power state to a high-power state). For example, the end device 304 powers-on its radio frequency (RF) transceiver to transmit a message, such as sensor reading or a status message. At 310 the end device 304 transmits a data message (e.g., an IEEE 802.15.4 Data frame) to the parent device 302. After receiving the data message, the parent device 302 determines, at 315, that there is no data pending to transmit to the end device 304. At 320 the parent device 302 transmits a data message acknowledgement (ACK) with the value of a frame pending field set to indicate that there is no data pending (e.g., the frame pending field set to a value of "0"). For example, the frame pending field is a subfield included in any MAC acknowledgement transmitted by the parent device. After receiving the data message acknowledgement, the end device 304 determines that there is no pending data for it at the parent device 302, and the end device 304 returns to a sleep state (transitions from the high-power state to the low-power state) to conserve power at 325.

Figure 3B:
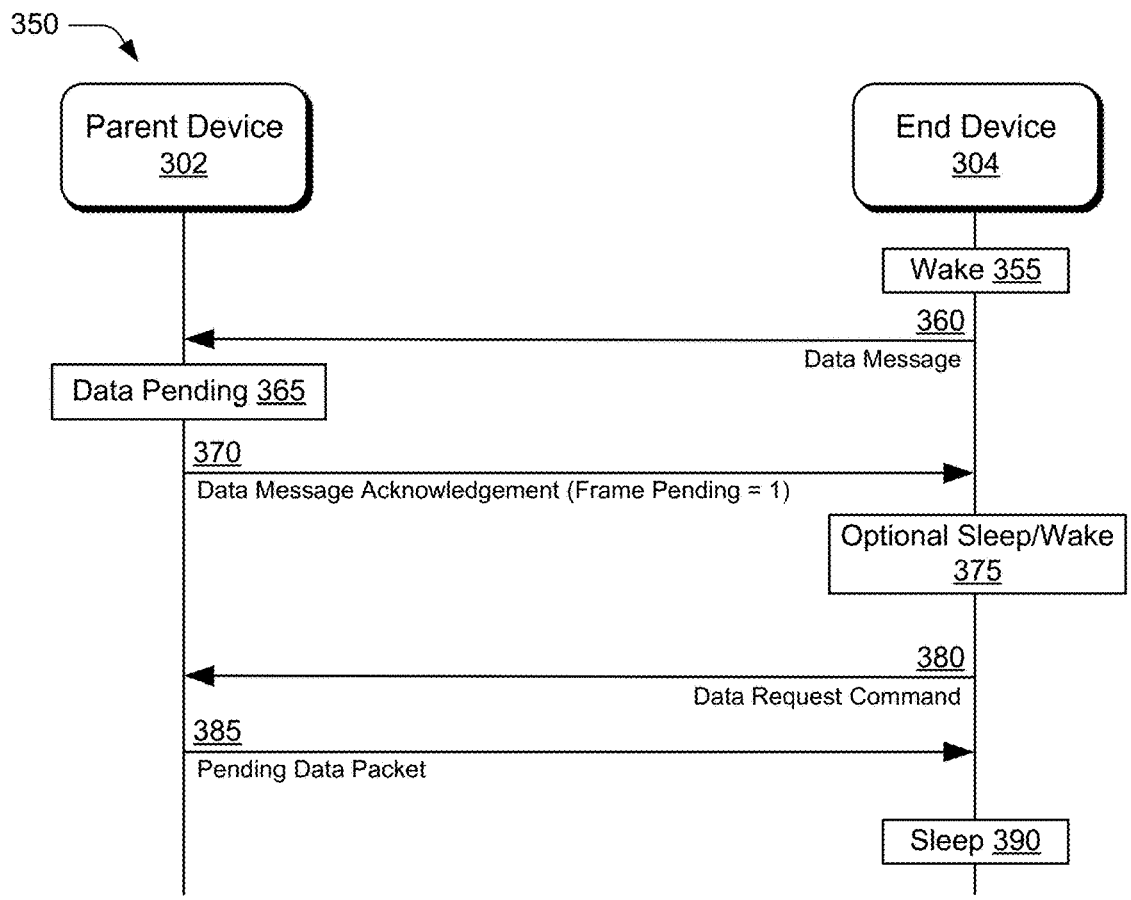
FIG. 3b illustrates another example of data and control transactions between a parent device and an end device in accordance with aspects of the techniques described herein.

FIG. 3b illustrates example data and control transactions between a parent device 302 and an end device 304 engaged in communication when there is pending data for the end device 304 on the parent device 302. At 355 the end device 304 wakes. For example, the end device 304 powers-on its RF transceiver to transmit application data. At 360 the end device transmits a data message (e.g., an IEEE 802.15.4 Data frame) to the parent device 302. After receiving the data message, the parent device 302 determines, at 365, that there is data pending to transmit to the end device 304. At 370 the parent device 302 transmits a data message acknowledgement (ACK) with the value of a frame pending field set to indicate that there is data pending (e.g., the frame pending field set to a value of "1"). After receiving the data message acknowledgement, the end device 304 determines that there is pending data for it at the parent device 302.

Optionally, at 375 the end device 304 may sleep for a period of time before proceeding to request the pending data. For example, the end device 304 may be in a resource-constrained state and needs to wait before having sufficient resources available to retrieve the pending data.

At 380 the end device transmits a data request command (e.g., an IEEE 802.15.4 Data Request command) to the parent device 302 to cause the parent device 302 to transmit the pending data at 385. After receiving the pending data, the end device 304 returns to a sleep state to conserve power at 390.

In an alternative aspect, after receiving the data message acknowledgement (ACK) with the value of a frame pending field set to indicate that there is data pending, the end device 304 may leave its receiver on to receive the pending data packet. In this alternative aspect, the data message that is sent, at 360, to the parent device 302 implicitly serves as the data request command to cause the parent device 302 to transmit the data message acknowledgement message followed by the pending data packet, if there is a pending data packet for the end device 304.

Operation in this alternative aspect can be established during the process of the end device 304 attaching as a child to the parent device 302, the end device 304 may indicate in a parent request message to the parent device 302 that the end device 304 supports receiving pending data in response to sending the data request command or the data message. Or the parent device 302 can transmit the pending data after sending the acknowledgement to the data request command, and if the parent device 302 receives an acknowledgement for the transmission of the pending data, the parent device 302 can infer that the end device 304 is configured to leave its receiver on to receive pending data after the data request.

Example Methods

Example methods 400 and 500 are described with reference to FIGS. 4 and 5 in accordance with one or more aspects of enhanced frame pending. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 4:
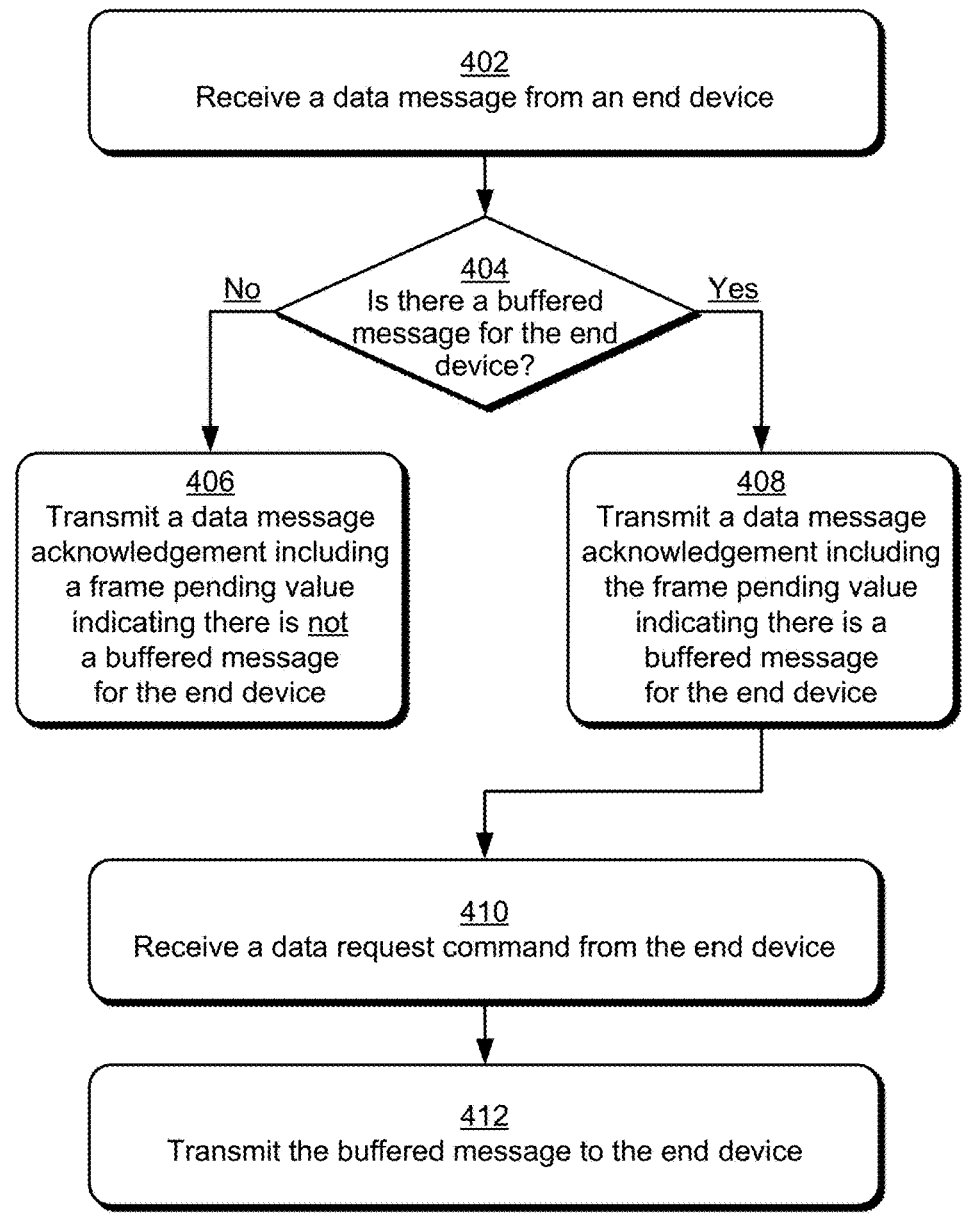
FIG. 4 illustrates an example method of enhanced frame pending as in accordance with aspects of the techniques described herein.

FIG. 4 illustrates example method(s) 400 of enhanced frame pending as generally related to a parent device in a wireless mesh network. The order in which the method blocks are described is not intended to be construed as a limitation, and any number of the described method blocks can be combined in any order or skipped to implement a method or an alternate method.

At block 402, a parent device (e.g., parent device 302) receives a data message (e.g., an IEEE 802.15.4 data message) from an end device (e.g., end device 304).

At block 404, in response to receiving the data message, the parent device determines whether there is a buffered message (e.g., a data packet) for the end device.

At block 406, responsive to determining there is not a buffered message for the end device, the parent device transmits a data message acknowledgement (e.g., an IEEE 802.15.4 MAC acknowledgement) including a frame pending value indicating there is not a buffered message for the end device.

At block 408, responsive to determining there is a buffered message for the end device, the parent device transmits a data message acknowledgement including a frame pending value indicating there is a buffered message for the end device.

At block 410, in response to transmitting the data message acknowledgement including the frame pending value indicating there is a buffered message for the end device, the parent device receives a data request command (e.g., an IEEE 802.15.4 Data Request command) from the end device.

At block 412, in response to receiving the data request command, the parent device transmits the buffered message to the end device.

Figure 5:
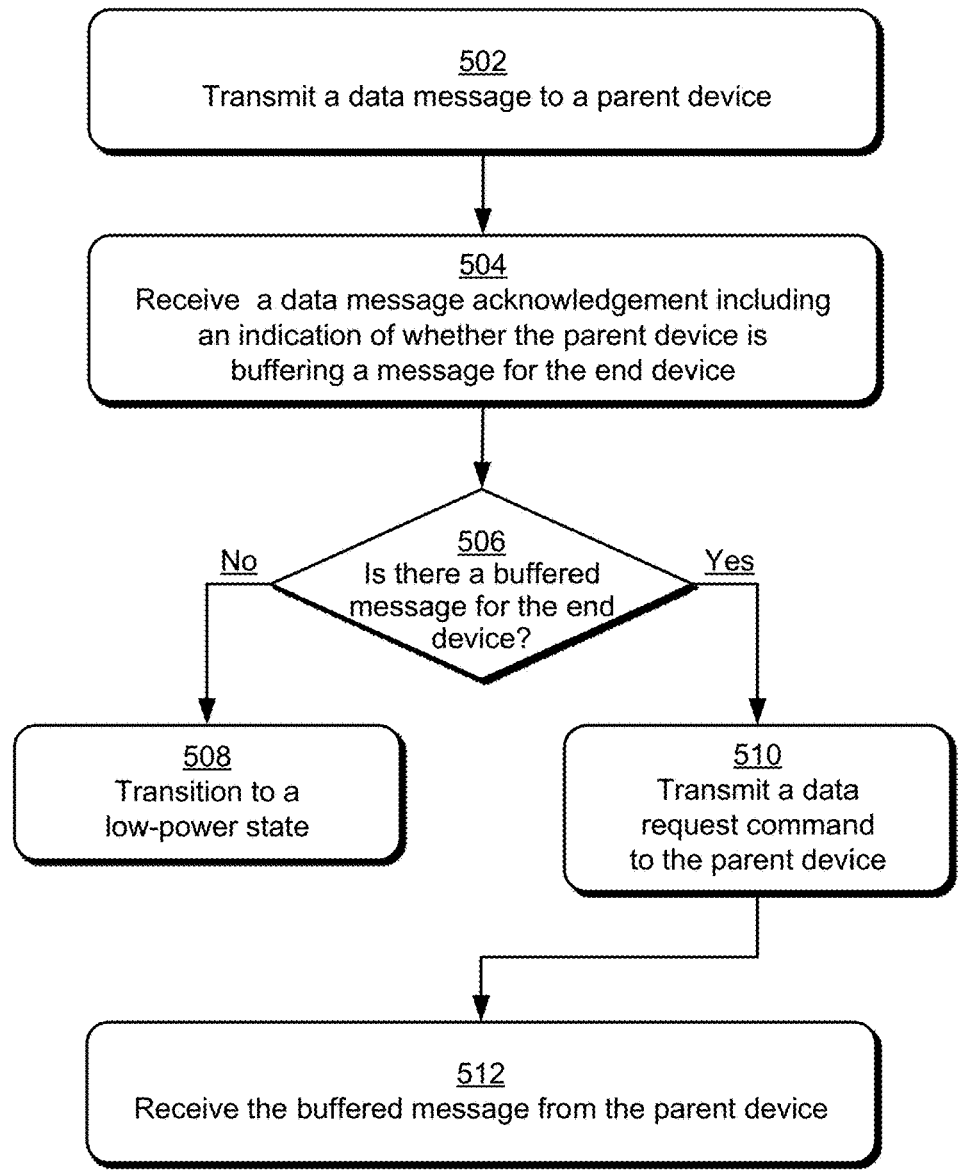
FIG. 5 illustrates an example method of enhanced frame pending in accordance with aspects of the techniques described herein.

FIG. 5 illustrates example method(s) 500 of enhanced frame pending as generally related to an end device in a wireless mesh network. The order in which the method blocks are described is not intended to be construed as a limitation, and any number of the described method blocks can be combined in any order or skipped to implement a method, or an alternate method.

At block 502, an end device (e.g., end device 304) transmits a data message (e.g., an IEEE 802.15.4 data message) to a parent device (e.g., the parent device 302).

At block 504, the end device receives a data message acknowledgement (e.g., an IEEE 802.15.4 MAC acknowledgement) including an indication of whether the parent device is buffering a message for the end device.

At block 506, the end device determines whether the parent device is buffering a message for the end device.

At block 508, responsive to determining there is not a buffered message for the end device, the end device transitions to a low-power state.

At block 510, responsive to determining there is a buffered message for the end device, transmits a data request command (e.g., an IEEE 802.15.4 Data Request command) to the parent device.

At block 512, responsive to transmitting a data request command to the parent device, the end device receives the buffered message from the parent device.

Example Environments and Devices

Figure 6:
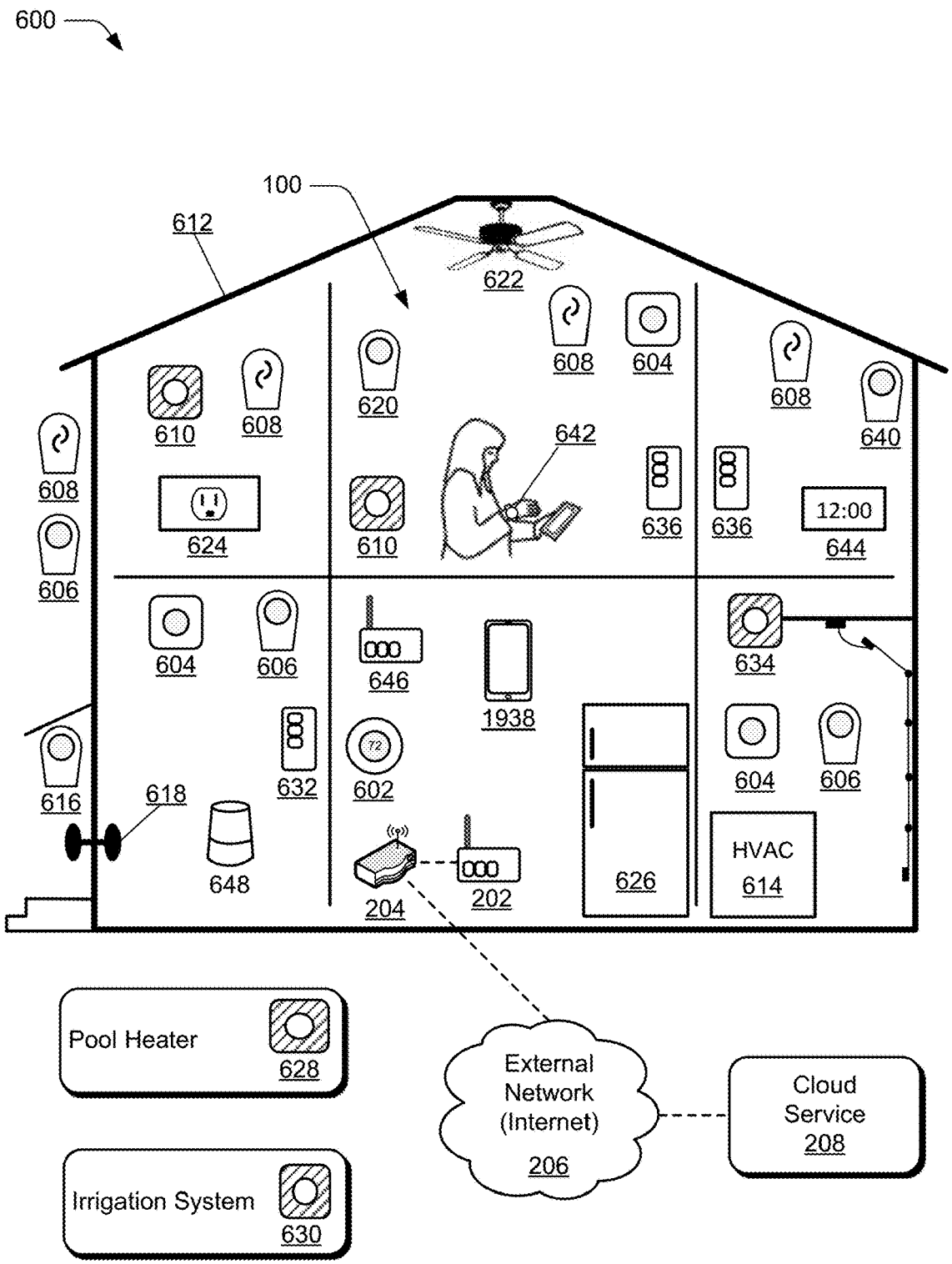
FIG. 6 illustrates an example environment in which a mesh network can be implemented in accordance with aspects of the techniques described herein.

FIG. 6 illustrates an example environment 600 in which the mesh network 100 (as described with reference to FIG. 1), and aspects of enhanced frame pending can be implemented. Generally, the environment 600 includes the mesh network 100 implemented as part of a smart-home or other type of structure with any number of mesh network devices that are configured for communication in a mesh network. For example, the mesh network devices can include a thermostat 602, hazard detectors 604 (e.g., for smoke and/or carbon monoxide), cameras 606 (e.g., indoor and outdoor), lighting units 608 (e.g., indoor and outdoor), and any other types of mesh network devices 610 that are implemented inside and/or outside of a structure 612 (e.g., in a smart-home environment). In this example, the mesh network devices can also include any of the previously described devices, such as a border router 202, as well as any of the devices implemented as a router device 102, and/or as an end device 106.

In the environment 600, any number of the mesh network devices can be implemented for wireless interconnection to wirelessly communicate and interact with each other. The mesh network devices are modular, intelligent, multi-sensing, network-connected devices that can integrate seamlessly with each other and/or with a central server or a cloud-computing system to provide any of a variety of useful smart-home objectives and implementations. An example of a mesh network device that can be implemented as any of the devices described herein is shown and described with reference to FIG. 7.

In implementations, the thermostat 602 may include a Nest® Learning Thermostat that detects ambient climate characteristics (e.g., temperature and/or humidity) and controls a HVAC system 614 in the smart-home environment. The learning thermostat 602 and other smart devices "learn" by capturing occupant settings to the devices. For example, the thermostat learns preferred temperature set-points for mornings and evenings, and when the occupants of the structure are asleep or awake, as well as when the occupants are typically away or at home.

A hazard detector 604 can be implemented to detect the presence of a hazardous substance or a substance indicative of a hazardous substance (e.g., smoke, fire, or carbon monoxide). In examples of wireless interconnection, a hazard detector 604 may detect the presence of smoke, indicating a fire in the structure, in which case the hazard detector that first detects the smoke can broadcast a low-power wake-up signal to all of the connected mesh network devices. The other hazard detectors 604 can then receive the broadcast wake-up signal and initiate a high-power state for hazard detection and to receive wireless communications of alert messages. Further, the lighting units 608 can receive the broadcast wake-up signal and activate in the region of the detected hazard to illuminate and identify the problem area. In another example, the lighting units 608 may activate in one illumination color to indicate a problem area or region in the structure, such as for a detected fire or break-in, and activate in a different illumination color to indicate safe regions and/or escape routes out of the structure.

In various configurations, the mesh network devices 610 can include an entryway interface device 616 that functions in coordination with a network-connected door lock system 618, and that detects and responds to a person's approach to or departure from a location, such as an outer door of the structure 612. The entryway interface device 616 can interact with the other mesh network devices based on whether someone has approached or entered the smart-home environment. An entryway interface device 616 can control doorbell functionality, announce the approach or departure of a person via audio or visual means, and control settings on a security system, such as to activate or deactivate the security system when occupants come and go. The mesh network devices 610 can also include other sensors and detectors, such as to detect ambient lighting conditions, detect room-occupancy states (e.g., with an occupancy sensor 620), and control a power and/or dim state of one or more lights. In some instances, the sensors and/or detectors may also control a power state or speed of a fan, such as a ceiling fan 622. Further, the sensors and/or detectors may detect occupancy in a room or enclosure and control the supply of power to electrical outlets or devices 624, such as if a room or the structure is unoccupied.

The mesh network devices 610 may also include connected appliances and/or controlled systems 626, such as refrigerators, stoves and ovens, washers, dryers, air conditioners, pool heaters 628, irrigation systems 630, security systems 632, and so forth, as well as other electronic and computing devices, such as televisions, entertainment systems, computers, intercom systems, garage-door openers 634, ceiling fans 622, control panels 636, and the like. When plugged in, an appliance, device, or system can announce itself to the mesh network as described above and can be automatically integrated with the controls and devices of the mesh network, such as in the smart-home. It should be noted that the mesh network devices 610 may include devices physically located outside of the structure, but within wireless communication range, such as a device controlling a swimming pool heater 628 or an irrigation system 630.

As described above, the mesh network 100 includes a border router 202 that interfaces for communication with an external network, outside the mesh network 100. The border router 202 connects to an access point 204, which connects to the communication network 206, such as the Internet. A cloud service 208, which is connected via the communication network 206, provides services related to and/or using the devices within the mesh network 100. By way of example, the cloud service 208 can include applications for connecting end user devices 638, such as smart phones, tablets, and the like, to devices in the mesh network, processing and presenting data acquired in the mesh network 100 to end users, linking devices in one or more mesh networks 100 to user accounts of the cloud service 208, provisioning and updating devices in the mesh network 100, and so forth. For example, a user can control the thermostat 602 and other mesh network devices in the smart-home environment using a network-connected computer or portable device, such as a mobile phone or tablet device. Further, the mesh network devices can communicate information to any central server or cloud-computing system via the border router 202 and the access point 204. The data communications can be carried out using any of a variety of custom or standard wireless protocols (e.g., Wi-Fi, ZigBee for low power, 6LoWPAN, Thread, etc.) and/or by using any of a variety of custom or standard wired protocols (CAT6 Ethernet, HomePlug, etc.).

Any of the mesh network devices in the mesh network 100 can serve as low-power and communication nodes to create the mesh network 100 in the smart-home environment. Individual low-power nodes of the network can regularly send out messages regarding what they are sensing, and the other low-powered nodes in the environment—in addition to sending out their own messages—can repeat the messages, thereby communicating the messages from node to node (i.e., from device to device) throughout the mesh network. The mesh network devices can be implemented to conserve power, particularly when battery-powered, utilizing low-powered communication protocols to receive the messages, translate the messages to other communication protocols, and send the translated messages to other nodes and/or to a central server or cloud-computing system. For example, an occupancy and/or ambient light sensor can detect an occupant in a room as well as measure the ambient light, and activate the light source when the ambient light sensor 640 detects that the room is dark and when the occupancy sensor 620 detects that someone is in the room. Further, the sensor can include a low-power wireless communication chip (e.g., a ZigBee chip) that regularly sends out messages regarding the occupancy of the room and the amount of light in the room, including instantaneous messages coincident with the occupancy sensor detecting the presence of a person in the room. As mentioned above, these messages may be sent wirelessly, using the mesh network, from node to node (i.e., smart device to smart device) within the smart-home environment as well as over the Internet to a central server or cloud-computing system.

In other configurations, various ones of the mesh network devices can function as "tripwires" for an alarm system in the smart-home environment. For example, in the event a perpetrator circumvents detection by alarm sensors located at windows, doors, and other entry points of the structure or environment, the alarm could still be triggered by receiving an occupancy, motion, heat, sound, etc. message from one or more of the low-powered mesh nodes in the mesh network. In other implementations, the mesh network can be used to automatically turn on and off the lighting units 608 as a person transitions from room to room in the structure. For example, the mesh network devices can detect the person's movement through the structure and communicate corresponding messages via the nodes of the mesh network. Using the messages that indicate which rooms are occupied, other mesh network devices that receive the messages can activate and/or deactivate accordingly. As referred to above, the mesh network can also be utilized to provide exit lighting in the event of an emergency, such as by turning on the appropriate lighting units 608 that lead to a safe exit. The light units 608 may also be turned-on to indicate the direction along an exit route that a person should travel to safely exit the structure.

The various mesh network devices may also be implemented to integrate and communicate with wearable computing devices 642, such as may be used to identify and locate an occupant of the structure, and adjust the temperature, lighting, sound system, and the like accordingly. In other implementations, RFID sensing (e.g., a person having an RFID bracelet, necklace, or key fob), synthetic vision techniques (e.g., video cameras and face recognition processors), audio techniques (e.g., voice, sound pattern, vibration pattern recognition), ultrasound sensing/imaging techniques, and infrared or near-field communication (NFC)

techniques (e.g., a person wearing an infrared or NFC-capable smartphone), along with rules-based inference engines or artificial intelligence techniques that draw useful conclusions from the sensed information as to the location of an occupant in the structure or environment.

In other implementations, personal comfort-area networks, personal health-area networks, personal safety-area networks, and/or other such human-facing functionalities of service robots can be enhanced by logical integration with other mesh network devices and sensors in the environment according to rules-based inferencing techniques or artificial intelligence techniques for achieving better performance of these functionalities. In an example relating to a personal health-area, the system can detect whether a household pet is moving toward the current location of an occupant (e.g., using any of the mesh network devices and sensors), along with rules-based inferencing and artificial intelligence techniques. Similarly, a hazard detector service robot can be notified that the temperature and humidity levels are rising in a kitchen, and temporarily raise a hazard detection threshold, such as a smoke detection threshold, under an inference that any small increases in ambient smoke levels will most likely be due to cooking activity and not due to a genuinely hazardous condition. Any service robot that is configured for any type of monitoring, detecting, and/or servicing can be implemented as a mesh node device on the mesh network, conforming to the wireless interconnection protocols for communicating on the mesh network.

The mesh network devices 610 may also include a smart alarm clock 644 for each of the individual occupants of the structure in the smart-home environment. For example, an occupant can customize and set an alarm device for a wake time, such as for the next day or week. Artificial intelligence can be used to consider occupant responses to the alarms when they go off and make inferences about preferred sleep patterns over time. An individual occupant can then be tracked in the mesh network based on a unique signature of the person, which is determined based on data obtained from sensors located in the mesh network devices, such as sensors that include ultrasonic sensors, passive IR sensors, and the like. The unique signature of an occupant can be based on a combination of patterns of movement, voice, height, size, etc., as well as using facial recognition techniques.

In an example of wireless interconnection, the wake time for an individual can be associated with the thermostat 602 to control the HVAC system in an efficient manner so as to pre-heat or cool the structure to desired sleeping and awake temperature settings. The preferred settings can be learned over time, such as by capturing the temperatures set in the thermostat before the person goes to sleep and upon waking up. Collected data may also include biometric indications of a person, such as breathing patterns, heart rate, movement, etc., from which inferences are made based on this data in combination with data that indicates when the person actually wakes up. Other mesh network devices can use the data to provide other smart-home objectives, such as adjusting the thermostat 602 so as to pre-heat or cool the environment to a desired setting, and turning-on or turning-off the lights 608.

In implementations, the mesh network devices can also be utilized for sound, vibration, and/or motion sensing such as to detect running water and determine inferences about water usage in a smart-home environment based on algorithms and mapping of the water usage and consumption. This can be used to determine a signature or fingerprint of each water source in the home, and is also referred to as "audio fingerprinting water usage." Similarly, the mesh network devices can be utilized to detect the subtle sound, vibration, and/or motion of unwanted pests, such as mice and other rodents, as well as by termites, cockroaches, and other insects. The system can then notify an occupant of the suspected pests in the environment, such as with warning messages to help facilitate early detection and prevention.

The environment 600 may include one or more mesh network devices 102 that function as a hub 646. The hub 646 may be a general-purpose home automation hub, or an application-specific hub, such as a security hub, an energy management hub, an HVAC hub, and so forth. The functionality of a hub 646 may also be integrated into any mesh network device 102, such as a smart thermostat device or the border router 202. Hosting functionality on the hub 646 in the structure 612 can improve reliability when the user's internet connection is unreliable, can reduce latency of operations that would normally have to connect to the cloud service 208, and can satisfy system and regulatory constraints around local access between mesh network devices 102.

Additionally, the example environment 600 includes a smart-speaker 648. The smart-speaker 648 provides voice assistant services that include providing voice control of smart-home devices. The functions of the hub 646 may be hosted in the smart-speaker 648. The smart-speaker 648 can be configured to communicate via the mesh network, Wi-Fi, or both.

Figure 7:
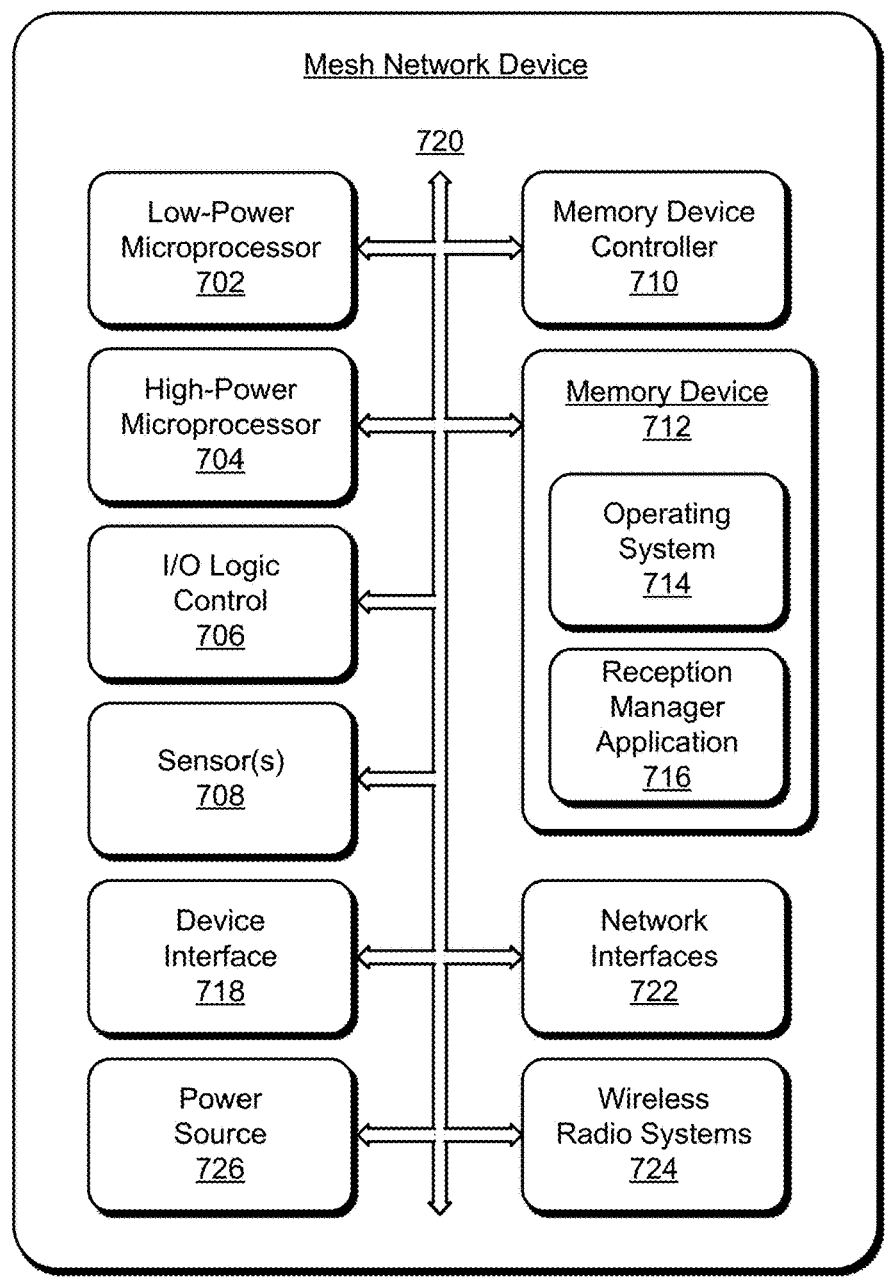
FIG. 7 illustrates an example mesh network device that can be implemented in a mesh network environment in accordance with one or more aspects of the techniques described herein.

FIG. 7 illustrates an example mesh network device 700 that can be implemented as any of the mesh network devices in a mesh network in accordance with one or more aspects of enhanced frame pending as described herein. The device 700 can be integrated with electronic circuitry, microprocessors, memory, input output (I/O) logic control, communication interfaces and components, as well as other hardware, firmware, and/or software to implement the device in a mesh network. Further, the mesh network device 700 can be implemented with various components, such as with any number and combination of different components as further described with reference to the example device shown in FIG. 8.

In this example, the mesh network device 700 includes a low-power microprocessor 702 and a high-power microprocessor 704 (e.g., microcontrollers or digital signal processors) that process executable instructions. The device also includes an input-output (I/O) logic control 706 (e.g., to include electronic circuitry). The microprocessors can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The low-power microprocessor 702 and the high-power microprocessor 704 can also support one or more different device functionalities of the device. For example, the high-power microprocessor 704 may execute computationally intensive operations, whereas the low-power microprocessor 702 may manage less complex processes such as detecting a hazard or temperature from one or more sensors 708. The low-power processor 702 may also wake or initialize the high-power processor 704 for computationally intensive processes.

The one or more sensors 708 can be implemented to detect various properties such as acceleration, temperature, humidity, water, supplied power, proximity, external motion, device motion, sound signals, ultrasound signals, light signals, fire, smoke, carbon monoxide, global-positioning-satellite (GPS) signals, radio frequency (RF), other electromagnetic signals or fields, or the like. As such, the sensors 708 may include any one or a combination of temperature sensors, humidity sensors, hazard-related sensors, other environmental sensors, accelerometers, microphones, optical sensors up to and including cameras (e.g., charged coupled-device or video cameras, active or passive radiation sensors, GPS receivers, and radio frequency identification detectors. In implementations, the mesh network device 700 may include one or more primary sensors, as well as one or more secondary sensors, such as primary sensors that sense data central to the core operation of the device (e.g., sensing a temperature in a thermostat or sensing smoke in a smoke detector), while the secondary sensors may sense other types of data (e.g., motion, light or sound), which can be used for energy-efficiency objectives or smart-operation objectives.

The mesh network device 700 includes a memory device controller 710 and a memory device 712, such as any type of a nonvolatile memory and/or other suitable electronic data storage device. The mesh network device 700 can also include various firmware and/or software, such as an operating system 714 that is maintained as computer executable instructions by the memory and executed by a microprocessor. The device software may also include a routing application 716 that implements aspects of enhanced frame pending. The mesh network device 700 also includes a device interface 718 to interface with another device or peripheral component, and includes an integrated data bus 720 that couples the various components of the mesh network device for data communication between the components. The data bus in the mesh network device may also be implemented as any one or a combination of different bus structures and/or bus architectures.

The device interface 718 may receive input from a user and/or provide information to the user (e.g., as a user interface), and a received input can be used to determine a setting. The device interface 718 may also include mechanical or virtual components that respond to a user input. For example, the user can mechanically move a sliding or rotatable component, or the motion along a touchpad may be detected, and such motions may correspond to a setting adjustment of the device. Physical and virtual movable user-interface components can allow the user to set a setting along a portion of an apparent continuum. The device interface 718 may also receive inputs from any number of peripherals, such as buttons, a keypad, a switch, a microphone, and an imager (e.g., a camera device).

The mesh network device 700 can include network interfaces 722, such as a mesh network interface for communication with other mesh network devices in a mesh network, and an external network interface for network communication, such as via the Internet. The mesh network device 700 also includes wireless radio systems 724 for wireless communication with other mesh network devices via the mesh network interface and for multiple, different wireless communications systems. The wireless radio systems 724 may include Wi-Fi, Bluetooth™, Mobile Broadband, BLE, and/or point-to-point IEEE 802.15.4. Each of the different radio systems can include a radio device, antenna, and chipset that is implemented for a particular wireless communications technology. The mesh network device 700 also includes a power source 726, such as a battery and/or to connect the device to line voltage. An AC power source may also be used to charge the battery of the device.

Figure 8:
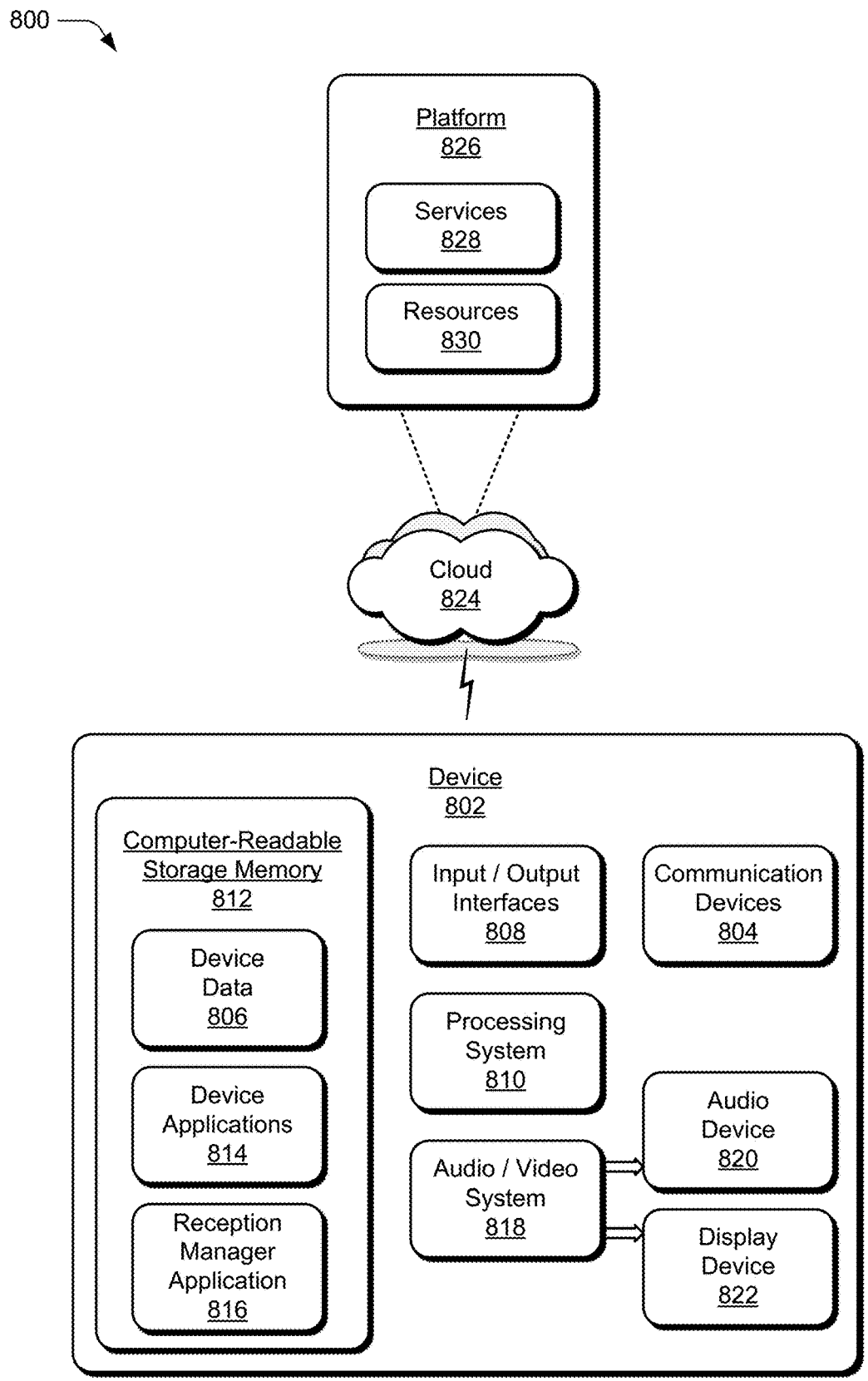
FIG. 8 illustrates an example system with an example device that can implement aspects of enhanced frame pending.

FIG. 8 illustrates an example system 800 that includes an example device 802, which can be implemented as any of the mesh network devices that implement aspects of enhanced frame pending as described with reference to the previous FIGS. 1-7. The example device 802 may be any type of computing device, client device, mobile phone, tablet, communication, entertainment, gaming, media playback, and/or other type of device. Further, the example device 802 may be implemented as any other type of mesh network device that is configured for communication on a mesh network, such as a thermostat, hazard detector, camera, light unit, commissioning device, router, border router, joiner router, joining device, end device, leader, access point, and/or other mesh network devices.

The device 802 includes communication devices 804 that enable wired and/or wireless communication of device data 806, such as data that is communicated between the devices in a mesh network, data that is being received, data scheduled for broadcast, data packets of the data, data that is synched between the devices, etc. The device data can include any type of communication data, as well as audio, video, and/or image data that is generated by applications executing on the device. The communication devices 804 can also include transceivers for cellular phone communication and/or for network data communication.

The device 802 also includes input/output (I/O) interfaces 808, such as data network interfaces that provide connection and/or communication links between the device, data networks (e.g., a mesh network, external network, etc.), and other devices. The I/O interfaces can be used to couple the device to any type of components, peripherals, and/or accessory devices. The I/O interfaces also include data input ports via which any type of data, media content, and/or inputs can be received, such as user inputs to the device, as well as any type of communication data, as well as audio, video, and/or image data received from any content and/or data source.

The device 802 includes a processing system 810 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage memory 812, such as data storage devices that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage memory in various memory device configurations.

The computer-readable storage memory 812 provides storage of the device data 806 and various device applications 814, such as an operating system that is maintained as a software application with the computer-readable storage memory and executed by the processing system 810. The device applications may also include a device manager, such as any form of a control application, software application, signal processing and control module, code that is native to a particular device, a hardware abstraction layer for a particular device, and so on. In this example, the device applications also include a routing application 816 that implements aspects of enhanced frame pending, such as when the example device 802 is implemented as any of the mesh network devices described herein.

The device 802 also includes an audio and/or video system 818 that generates audio data for an audio device 820 and/or generates display data for a display device 822. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device. In aspects, at least part of the techniques described for enhanced frame pending may be implemented in a distributed system, such as over a "cloud" 824 in a platform 826. The cloud 824 includes and/or is representative of the platform 826 for services 828 and/or resources 830.

The platform 826 abstracts underlying functionality of hardware, such as server devices (e.g., included in the services 828) and/or software resources (e.g., included as the resources 830), and connects the example device 802 with other devices, servers, etc. The resources 830 may also include applications and/or data that can be utilized while computer processing is executed on servers that are remote from the example device 802. Additionally, the services 828 and/or the resources 830 may facilitate subscriber network services, such as over the Internet, a cellular network, or Wi-Fi network. The platform 826 may also serve to abstract and scale resources to service a demand for the resources 830 that are implemented via the platform, such as in an interconnected device aspect with functionality distributed throughout the system 800. For example, the functionality may be implemented in part at the example device 802 as well as via the platform 826 that abstracts the functionality of the cloud 824.

Although aspects of enhanced frame pending have been described in language specific to features and/or methods, the subject of the appended claims is not necessarily limited to the specific features or methods described. Rather, the specific features and methods are disclosed as example implementations of enhanced frame pending, and other equivalent features and methods are intended to be within the scope of the appended claims. Further, various different aspects are described and it is to be appreciated that each described aspect can be implemented independently or in connection with one or more other described aspects.

The invention claimed is:

1. A method of indicating pending data by a parent device in a wireless mesh network, the method comprising:
   receiving, by the parent device, a data message from an end device;
   in response to receiving the data message, determining whether there is a buffered message for the end device; and either:
      responsive to determining there is not a buffered message for the end device, transmitting a data message acknowledgement including a frame pending value indicating there is not a buffered message for the end device; or
      responsive to determining there is a buffered message for the end device, transmitting the data message acknowledgement including the frame pending value indicating there is a buffered message for the end device, which is effective to cause the end device to request the buffered message;
   receiving, by the parent device, a parent request message that indicates that the end device is configured to receive buffered messages in response to transmitting a data request command; and
   in response to receiving the parent request message, configuring the parent device to transmit the buffered messages to the end device in response to receiving the data request command from the end device.

2. The method of claim 1, comprising:
   receiving, by the parent device, the data request command from the end device; and
   in response to the data request command, transmitting the buffered message to the end device.

3. The method of claim 2, wherein the data request command is an IEEE 802.15.4 Data Request command.

4. The method of claim 2, wherein if the parent device fails to receive an acknowledgement in response to transmitting the buffered message, the parent device buffers the message until receiving another data request command from the end device.

5. The method of claim 1, comprising:
   receiving, by the parent device, a message addressed to the end device;
   acknowledging the message on behalf of the end device; and
   buffering the message.

6. The method of claim 1, wherein the data message is an IEEE 802.15.4 data message.

7. A mesh network device configured as a parent device, the mesh network device comprising:
   a mesh network interface configured for communication in a wireless mesh network; and
   a memory and processor system to implement a routing application that is configured to:
      receive a data message from an end device;
      in response to the reception of the data message, determine whether there is a buffered message for the end device; and either:
         responsive to the determination that there is not a buffered message for the end device, transmit a data message acknowledgement including a frame pending value indicating there is not a buffered message for the end device; or
         responsive to the determination that there is a buffered message for the end device, transmit the data message acknowledgement including the frame pending value indicating there is a buffered message for the end device, which is effective to cause the end device to request the buffered message;
      receive a parent request message that indicates that the end device is configured to receive buffered messages in response to transmission of a data request command; and in response to the reception of the parent request message, configure the parent device to transmit the buffered messages to the end device in response to receiving the data request command from the end device.

8. The mesh network device of claim 7, wherein the routing application is configured to:
receive the data request command from the end device; and
in response to the data request command, transmit the buffered message to the end device.

9. The mesh network device of claim 8, wherein the data request command is an IEEE 802.15.4 Data Request command.

10. The mesh network device of claim 8, wherein the routing application is configured to:
if the parent device fails to receive an acknowledgement in response to the transmission of the buffered message, buffer the message until receiving another data request command from the end device.

11. The mesh network device of claim 7, wherein the transmission of the data message acknowledgement, including the frame pending value indicating there is a buffered message for the end device, is effective to cause the end device to keep a receiver on to receive the buffered message after receiving the data message acknowledgement, and wherein the routing application is configured to:
transmit the buffered message to the end device after the transmission of the data message acknowledgement and without receiving a data request command from the end device.

12. The mesh network device of claim 7, wherein the data message is an IEEE 802.15.4 data message.

13. A mesh network device configured as an end device, the mesh network device comprising:
a mesh network interface configured for communication in a wireless mesh network; and
a memory and processor system to implement a routing application that is configured to:
transmit, to a parent device, a parent request message that indicates that the end device is configured to receive buffered messages in response to the transmission of a data request command, the transmission being effective to configure the parent device to transmit the buffered messages to the end device in response to receiving the data request command from the end device;
transmit a data message to the parent device;
in response to the transmission of the data message, receive, from the parent device, a data message acknowledgement including an indication of whether the parent device is buffering a message for the end device; and either:
transmit the data request command that is effective to cause the parent device to transmit the buffered message, and receive the buffered message from the parent device; or
transition to a low-power state.

14. The mesh network device of claim 13, wherein the end device transitions from the low-power state to a high-power state before the transmission of the data message to the parent device.

15. The mesh network device of claim 13, wherein the routing application is configured to:
transition the end device to the low-power state after receiving the data message acknowledgement; and
after a period of time, transition the end device to a high-power state before transmitting the data request command.

16. The mesh network device of claim 13, wherein the data request command is an IEEE 802.15.4 Data Request command.

17. The mesh network device of claim 13, wherein the data message is destined for the parent device, or wherein the transmission of the data message is effective to cause the parent device to forward the message to another device.

18. A mesh network device configured as a parent device, the mesh network device comprising:
a mesh network interface configured for communication in a wireless mesh network; and
a memory and processor system to implement a routing application that is configured to:
receive a data message from an end device;
in response to the reception of the data message, determine whether there is a buffered message for the end device; and either:
responsive to the determination that there is not a buffered message for the end device, transmit a data message acknowledgement including a frame pending value indicating there is not a buffered message for the end device; or
responsive to the determination that there is a buffered message for the end device, transmit the data message acknowledgement including the frame pending value indicating there is a buffered message for the end device, which is effective to cause the end device to request the buffered message and is effective to cause the end device to keep a receiver on to receive the buffered message after receiving the data message acknowledgement; and
transmit the buffered message to the end device after the transmission of the data message acknowledgement and without receiving a data request command from the end device.

19. The mesh network device of claim 18, wherein the routing application is configured to:
receive a parent request message that indicates that the end device is configured to receive buffered messages in response to the transmission of the data request command; and
in response to the reception of the parent request message, configure the parent device to transmit the buffered messages to the end device in response to receiving the data request command from the end device.

20. The mesh network device of claim 18, wherein the data message is an IEEE 802.15.4 data message.

21. A method of determining pending data by mesh network device configured as an end device, the method comprising:
transmitting, to the parent device, a parent request message that indicates that the end device is configured to receive buffered messages in response to the transmitting of the data request command, the transmitting being effective to configure the parent device to transmit the buffered messages to the end device in response to receiving the data request command from the end device;
transmitting a data message to a parent device;
in response to the transmitting of the data message, receiving, from the parent device, a data message acknowledgement including an indication of whether the parent device is buffering a message for the end device; and either:

transmitting a data request command that is effective to cause the parent device to transmit the buffered message, and receive the buffered message from the parent device; or transitioning to a low-power state.

22. The method of claim 21, wherein the end device transitions from the low-power state to a high-power state before the transmitting the data message to the parent device.

23. The method of claim 21, the method comprising:

transitioning to the low-power state after receiving the data message acknowledgement; and after a period of time, transitioning to a high-power state before transmitting the data request command.

24. The method of claim 21, wherein the data request command is an IEEE 802.15.4 Data Request command.

25. The method of claim 21, wherein the data message is destined for the parent device, or wherein the transmission of the data message is effective to cause the parent device to forward the message to another device.

* * * * *